United States Patent
Shim et al.

(10) Patent No.: US 8,303,454 B1
(45) Date of Patent: Nov. 6, 2012

(54) TRANSMISSION FOR VEHICLE

(75) Inventors: Hyu Tae Shim, Hwaseong-si (KR); Kang Soo Seo, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/316,545

(22) Filed: Dec. 11, 2011

(30) Foreign Application Priority Data

Sep. 21, 2011 (KR) ........................ 10-2011-0095034

(51) Int. Cl.
*F16H 3/44* (2006.01)
(52) U.S. Cl. ...................................... 475/280
(58) Field of Classification Search .................. 475/284, 475/288, 286, 287
See application file for complete search history.

(56) References Cited

U.S. PATENT DOCUMENTS

| 7,517,297 B2 * | 4/2009 | Tabata et al. ................. 475/276 |
| 7,980,985 B2 * | 7/2011 | Seo et al. ...................... 475/275 |
| 2009/0118058 A1 * | 5/2009 | Suh ............................... 475/275 |
| 2010/0222176 A1 * | 9/2010 | Shim ............................ 475/292 |

FOREIGN PATENT DOCUMENTS

KR   10-2010-0097706 A   9/2010

* cited by examiner

*Primary Examiner* — David D Le
*Assistant Examiner* — David J Hlavka
(74) *Attorney, Agent, or Firm* — Morgan, Lewis & Bockius LLP

(57) ABSTRACT

A transmission for a vehicle employs parts as few as possible to provide forward 11-speed and reverse 1-speed gear ratios while having a relatively simple configuration, thereby allowing the operational state of an engine connected to the transmission to be in an optimal state. Thus, the transmission makes it possible to improve fuel efficiency and secure smooth driving performance of the vehicle.

8 Claims, 2 Drawing Sheets

|  | CL1 | CL2 | CL3 | CL4 | B1 | B2 | B3 | F1 |
|---|---|---|---|---|---|---|---|---|
| 1st | ● |  |  |  | ● |  | ● | ○ |
| 2nd | ● |  |  |  |  | ● | ● |  |
| 3rd | ● | ● |  |  |  |  | ● |  |
| 4th |  | ● |  |  |  | ● | ● |  |
| 5th |  | ● | ● |  |  |  | ● |  |
| 6th |  | ● | ● |  |  | ● |  |  |
| 7th | ● | ● | ● |  |  |  |  |  |
| 8th | ● |  | ● |  |  | ● |  |  |
| 9th | ● |  | ● |  | ● |  |  |  |
| 10th |  |  | ● |  | ● | ● |  |  |
| 11th |  |  | ● | ● | ● |  |  |  |
| Rev |  |  |  | ● | ● |  | ● |  |

TRANSMISSION FOR VEHICLE

CROSS-REFERENCE TO RELATED APPLICATION

The present application claims priority to Korean Patent Application No. 10-2011-0095034, filed on Sep. 21, 2011, the entire contents of which is incorporated herein for all purposes by this reference.

BACKGROUND OF THE INVENTION

1. Field of the Invention

The present invention relates, in general, to a transmission for a vehicle, and, more particularly, to a structure of a transmission capable of realizing forward 11-speed and reverse 1-speed gear ratios.

2. Description of Related Art

Vehicles are equipped with a transmission so as to able to supply power generated from a power source such as an engine to drive wheels at the proper rotational speed and torque converted depending on driving conditions.

Such a transmission generally provides a plurality of gear ratios from a maximum gear ratio for meeting maximum hill-climbing capability to a minimum gear ratio for obtaining the highest speed of a vehicle. In theory, the greater the number of gear ratios, the more advantageous it is to secure the optimal driving point of the engine, so that it is possible to contribute to improving the fuel efficiency of the vehicle.

For reference, the prior art document, Korean Unexamined Patent Application Publication No. 10-2010-0097706, discloses a structure of a transmission capable of realizing forward 10-speed and reverse 2-speed gear ratios.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle, which employs parts as few as possible to provide forward 11-speed and reverse 1-speed gear ratios along with relatively simple configuration, thereby allowing an engine connected thereto to be operated in an optimum state, and thus making it possible to improve fuel efficiency and to secure smooth driving performance in the vehicle.

In an aspect of the present invention, a transmission for a vehicle may include a first complex planetary gear train in which a first planetary gear train and a second planetary gear train are coupled to each other, a second complex planetary gear train in which a third planetary gear train and a fourth planetary gear train are coupled to each other, and which at least one rotational element of the second complex planetary gear train is connected with at least a rotational element of the first complex planetary gear train, an input shaft which is permanently connected to at least one rotational element of the first complex planetary gear train and is selectively connected to at least one rotational element of the first complex planetary gear train and at least a rotational element of the second complex planetary gear train, an output shaft which is connected to a rotational element of the second complex planetary gear train, first and second brakes which lock at least two rotational elements of the first complex planetary gear train, a third brake which locks a rotational element of the second complex planetary gear train, and a first clutch which selectively connects a rotational element of the first planetary gear train and a rotational element of the second planetary gear train to each other.

The input shaft is selectively connected to a second rotational element of the first planetary gear train and a third rotational element of the second planetary gear train via a second clutch, the input shaft is selectively connected to a third rotational element of the third planetary gear train and a second rotational element of the fourth planetary gear train via a third clutch, the input shaft is selectively connected to a first rotational element of the first planetary gear train via a fourth clutch, the output shaft is permanently connected to a second rotational element of the third planetary gear train, and a third rotational element of the first planetary gear train is permanently connected to a third rotational element of the fourth planetary gear train.

The first complex planetary gear train is configured so that a second rotational element of the first planetary gear train and a third rotational element of the second planetary gear train are permanently connected to each other, and a third rotational element of the first planetary gear train and a second rotational element of the second planetary gear train are selectively connected to each other via the first clutch.

The second complex planetary gear train is configured so that a first rotational element of the third planetary gear train and a first rotational element of the fourth planetary gear train are permanently connected to each other, and a third rotational element of the third planetary gear train and a second rotational element of the fourth planetary gear train are permanently connected to each other.

First, second, and third rotational elements of the first planetary gear train sequentially correspond to a first sun gear, a first carrier, and a first ring gear, first, second, and third rotational elements of the second planetary gear train sequentially correspond to a second sun gear, a second carrier, and a second ring gear, first, second, and third rotational elements of the third planetary gear train sequentially correspond to a third sun gear, a third carrier, and a third ring gear, first, second, and third rotational elements of the fourth planetary gear train sequentially correspond to a fourth sun gear, a fourth carrier, and a fourth ring gear, first complex planetary gear train is configured as a CR-CR type complex planetary gear train when the first carrier is permanently connected to the second ring gear and when the first ring gear is selectively connected to the second carrier via the first clutch.

The second complex planetary gear train is configured as a Simpson type complex planetary gear train when the third sun gear is permanently connected to the fourth sun gear and when the third ring gear is permanently connected to the fourth carrier, and the fourth ring gear is permanently connected to the first ring gear.

The input shaft is permanently connected to the second sun gear, is selectively connected to a connector between the first carrier and the second ring gear via a second clutch and a connector between the third ring gear and the fourth carrier via a third clutch, and is selectively connected to the first sun gear via a fourth clutch, and the output shaft is connected to the third carrier.

The first brake is installed so as to be able to selectively lock the connector between the first carrier and the second ring gear, the second brake is installed so as to be able to selectively lock the first sun gear, and the third brake is installed so as to be able to selectively lock a connector between the third sun gear and the fourth sun gear.

The transmission may further include a one-way clutch that prevents the connector between the first carrier and the second ring gear from rotating in a reverse direction.

According to the present invention, the transmission employs as few parts as possible to provide forward 11-speed and reverse 1-speed gear ratios while having a relatively simple configuration, thereby allowing the operational state of an engine connected to the transmission to be an optimal state, and thus making it possible to improve fuel efficiency and to secure smooth driving performance of the vehicle.

The methods and apparatuses of the present invention may have other features and advantages which will be apparent from or are set forth in more detail in the accompanying drawings, which are incorporated herein, and the following Detailed Description, which together serve to explain certain principles of the present invention.

Figures 1, 2:
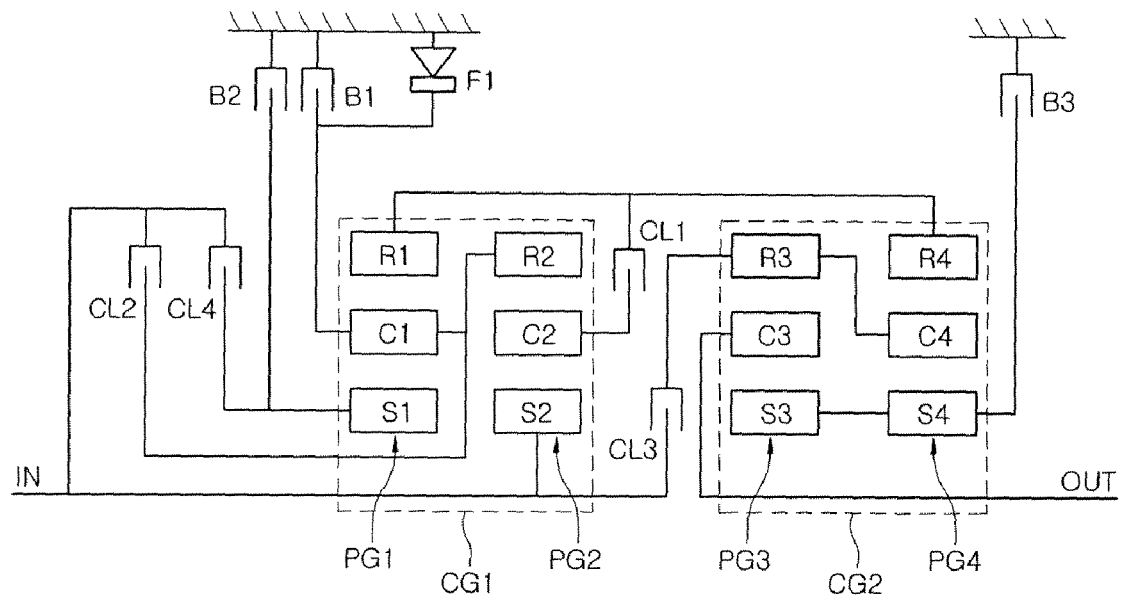
FIG. 1 shows configuration of a transmission for a vehicle according to an exemplary embodiment of the present invention.
FIG. 2 shows an operational chart of operating elements of the transmission of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be may include d within the spirit and scope of the invention as defined by the appended claims.

Figure 3:
FIG. 3 is a lever diagram explaining operation of the transmission of FIG. 1.
Figure 3:
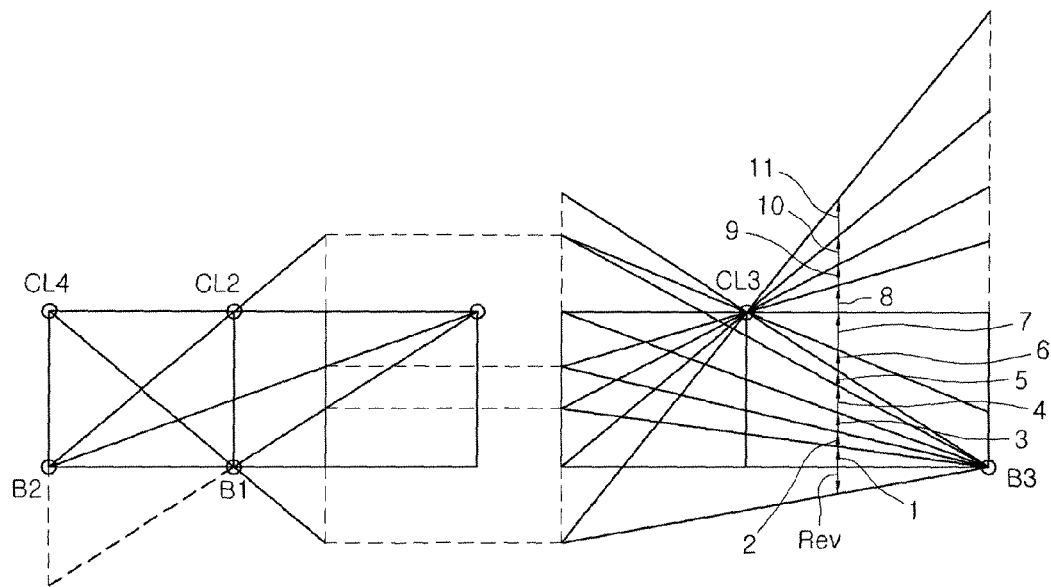

Referring to FIGS. 1 to 3, a transmission for a vehicle according to an exemplary embodiment of the present invention may include a first complex planetary gear train CG1 in which a first planetary gear train PG1 and a second planetary gear train PG2 are coupled to each other, a second complex planetary gear train CG2 in which a third planetary gear train PG3 and a fourth planetary gear train PG4 are coupled to each other and at least one rotational element thereof is connected with a rotational element of the first complex planetary gear train CG1, an input shaft IN which is permanently connected to at least one rotational element of the first complex planetary gear train CG1 and is selectively connected to another rotational element of the first complex planetary gear train CG1 and a rotational element of the second complex planetary gear train CG2, an output shaft OUT which is connected to one of the rotational elements of the second complex planetary gear train CG2, first and second brakes B1 and B2 which lock the rotational elements of the first complex planetary gear train CG1, a third brake B3 which locks the rotational element of the second complex planetary gear train CG2, and a first clutch CL1 which selectively connects the rotational element of the first planetary gear train PG1 and the rotational element of the second planetary gear train PG2 to each other.

As described above, the input shaft IN is connected to the rotational elements of the first and second complex planetary gear trains CG1 and CG2 via a plurality of paths. In the present embodiment, the input shaft IN is permanently connected to a first rotational element of the second planetary gear train PG2. In addition to this, the input shaft IN is selectively connected to the second rotational element of the first planetary gear train PG1 and the third rotational element of the second planetary gear train PG2 via a second clutch CL2, to a third rotational element of the third planetary gear train PG3 and a second rotational element of the fourth planetary gear train PG4 via a third clutch CL3, and to a first rotational element of the first planetary gear train PG1 via a fourth clutch CL4.

Further, the output shaft OUT is connected to a second rotational element of the third planetary gear train PG3. A third rotational element of the first planetary gear train PG1 is permanently connected to a third rotational element of the fourth planetary gear train PG4.

The first complex planetary gear train CG1 is configured so that a second rotational element of the first planetary gear train PG1 is permanently connected to a third rotational element of the second planetary gear train PG2, and that a third rotational element of the first planetary gear train PG1 is selectively connected to a second rotational element of the second planetary gear train PG2 via the first clutch CL1, and vice versa.

The second complex planetary gear train CG2 is configured to permanently connect a first rotational element of the third planetary gear train PG3 and a first rotational element of the fourth planetary gear train PG4 to each other and a third rotational element of the third planetary gear train PG3 and a second rotational element of the fourth planetary gear train PG4 to each other.

Herein, the first, second, and third rotational elements of the first planetary gear train PG1 are sequentially referred to as a first sun gear S1, a first carrier C1, and a first ring gear R1. The first, second, and third rotational elements of the second planetary gear train PG2 are sequentially referred to as a second sun gear S2, a second carrier C2, and a second ring gear R2. The first, second, and third rotational elements of the third planetary gear train PG3 are sequentially referred to as a third sun gear S3, a third carrier C3, and a third ring gear R3. The first, second, and third rotational elements of the fourth planetary gear train PG4 are sequentially referred to as a fourth sun gear S4, a fourth carrier C4, and a fourth ring gear R4.

Thus, in the first complex planetary gear train CG1, the first carrier C1 is permanently connected to the second ring gear R2, and the first ring gear R1 is selectively connected to the second carrier C2 via the first clutch CL1. When the selective connection is made by the first clutch CL1, the first complex planetary gear train CG1 is configured as a CR-CR type complex planetary gear train.

Further, in the second complex planetary gear train CG2, the third sun gear S3 is permanently connected to a fourth sun gear S4, and the third ring gear R3 is permanently connected to the fourth carrier C4. Thereby, the second complex planetary gear train CG2 is configured as a Simpson type complex planetary gear train.

The input shaft IN is permanently connected to the second sun gear S2, is selectively connected to a connector between the first carrier C1 and the second ring gear R2 via the second clutch CL2 and a connector between the third ring gear R3 and the fourth carrier C4 via the third clutch CL3, and is selectively connected to the first sun gear S1 via the fourth clutch CL4. The output shaft OUT is connected to the third carrier C3, and the fourth ring gear R4 is permanently connected to the first ring gear R1.

The first brake B1 is installed so as to be able to selectively lock the connector between the first carrier C1 and the second ring gear R2. The second brake B2 is installed so as to be able to selectively lock the first sun gear S1. The third brake B3 is installed so as to be able to selectively lock a connector between the third sung gear S3 and the fourth sun gear S4.

Further, to prevent the connector between the first carrier C1 and the second ring gear R2 from rotating in reverse, a one-way clutch F1 is provided.

The first to fourth clutches CL1 to CL4 and the first to third brakes B1 to B3 are operated as in Table of FIG. 2. Thereby, the transmission for a vehicle configured as described above realizes forward 1-speed to 11-speed gear ratios and a reverse 1-speed gear ratio. This operation is shown in a lever diagram in FIG. 3

As shown on the left side of FIG. 3, the first complex planetary gear train CG1 realizes two forward reduction ratios, one reverse reduction ratio, one step-up ratio, one 11 ratio, and one zero ratio. The second complex planetary gear train CG2 to which power shifted by this gear ratios realizes forward 11-speed and reverse 1-speed gear ratios as shown in the right side of FIG. 3.

The foregoing descriptions of specific exemplary embodiments of the present invention may have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle comprising
   a first complex planetary gear train in which a first planetary gear train and a second planetary gear train are coupled to each other,
   a second complex planetary gear train in which a third planetary gear train and a fourth planetary gear train are coupled to each other, and which at least one rotational element of the second complex planetary gear train is connected with at least a rotational element of the first complex planetary gear train,
   an input shaft which is permanently connected to at least one rotational element of the first complex planetary gear train and is selectively connected to at least one rotational element of the first complex planetary gear train and at least a rotational element of the second complex planetary gear train,
   an output shaft which is connected to a rotational element of the second complex planetary gear train,
   first and second brakes which lock at least two rotational elements of the first complex planetary gear train,
   a third brake which locks a rotational element of the second complex planetary gear train, and
   a first clutch which selectively connects a rotational element of the first planetary gear train and a rotational element of the second planetary gear train to each other,
   wherein the first complex planetary gear train is configured so that a second rotational element of the first planetary gear train and a third rotational element of the second planetary gear train are permanently connected to each other, and a third rotational element of the first planetary gear train and a second rotational element of the second planetary gear train are selectively connected to each other via the first clutch.

2. The transmission according to claim 1, wherein
   the input shaft is selectively connected to a second rotational element of the first planetary gear train and a third rotational element of the second planetary gear train via a second clutch,
   the input shaft is selectively connected to a third rotational element of the third planetary gear train and a second rotational element of the fourth planetary gear train via a third clutch,
   the input shaft is selectively connected to a first rotational element of the first planetary gear train via a fourth clutch,
   the output shaft is permanently connected to a second rotational element of the third planetary gear train, and
   a third rotational element of the first planetary gear train is permanently connected to a third rotational element of the fourth planetary gear train.

3. The transmission according to claim 1, wherein the second complex planetary gear train is configured so that a first rotational element of the third planetary gear train and a first rotational element of the fourth planetary gear train are permanently connected to each other, and a third rotational element of the third planetary gear train and a second rotational element of the fourth planetary gear train are permanently connected to each other.

4. The transmission according to claim 1, wherein
   first, second, and third rotational elements of the first planetary gear train sequentially correspond to a first sun gear, a first carrier, and a first ring gear,
   first, second, and third rotational elements of the second planetary gear train sequentially correspond to a second sun gear, a second carrier, and a second ring gear,
   first, second, and third rotational elements of the third planetary gear train sequentially correspond to a third sun gear, a third carrier, and a third ring gear,
   first, second, and third rotational elements of the fourth planetary gear train sequentially correspond to a fourth sun gear, a fourth carrier, and a fourth ring gear,
   first complex planetary gear train is configured as a CR-CR type complex planetary gear train when the first carrier is permanently connected to the second ring gear and when the first ring gear is selectively connected to the second carrier via the first clutch.

5. The transmission according to claim 4, wherein
   the second complex planetary gear train is configured as a Simpson type complex planetary gear train when the third sun gear is permanently connected to the fourth sun gear and when the third ring gear is permanently connected to the fourth carrier, and
   the fourth ring gear is permanently connected to the first ring gear.

6. The transmission according to claim 5, wherein
the input shaft is permanently connected to the second sun gear, is selectively connected to a connector between the first carrier and the second ring gear via a second clutch and a connector between the third ring gear and the fourth carrier via a third clutch, and is selectively connected to the first sun gear via a fourth clutch, and
the output shaft is connected to the third carrier.

7. The transmission according to claim 6, wherein
the first brake is installed so as to be able to selectively lock the connector between the first carrier and the second ring gear,
the second brake is installed so as to be able to selectively lock the first sun gear, and
the third brake is installed so as to be able to selectively lock a connector between the third sun gear and the fourth sun gear.

8. The transmission according to claim 7, further comprising a one-way clutch that prevents the connector between the first carrier and the second ring gear from rotating in a reverse direction.

* * * * *